Patented Mar. 28, 1939

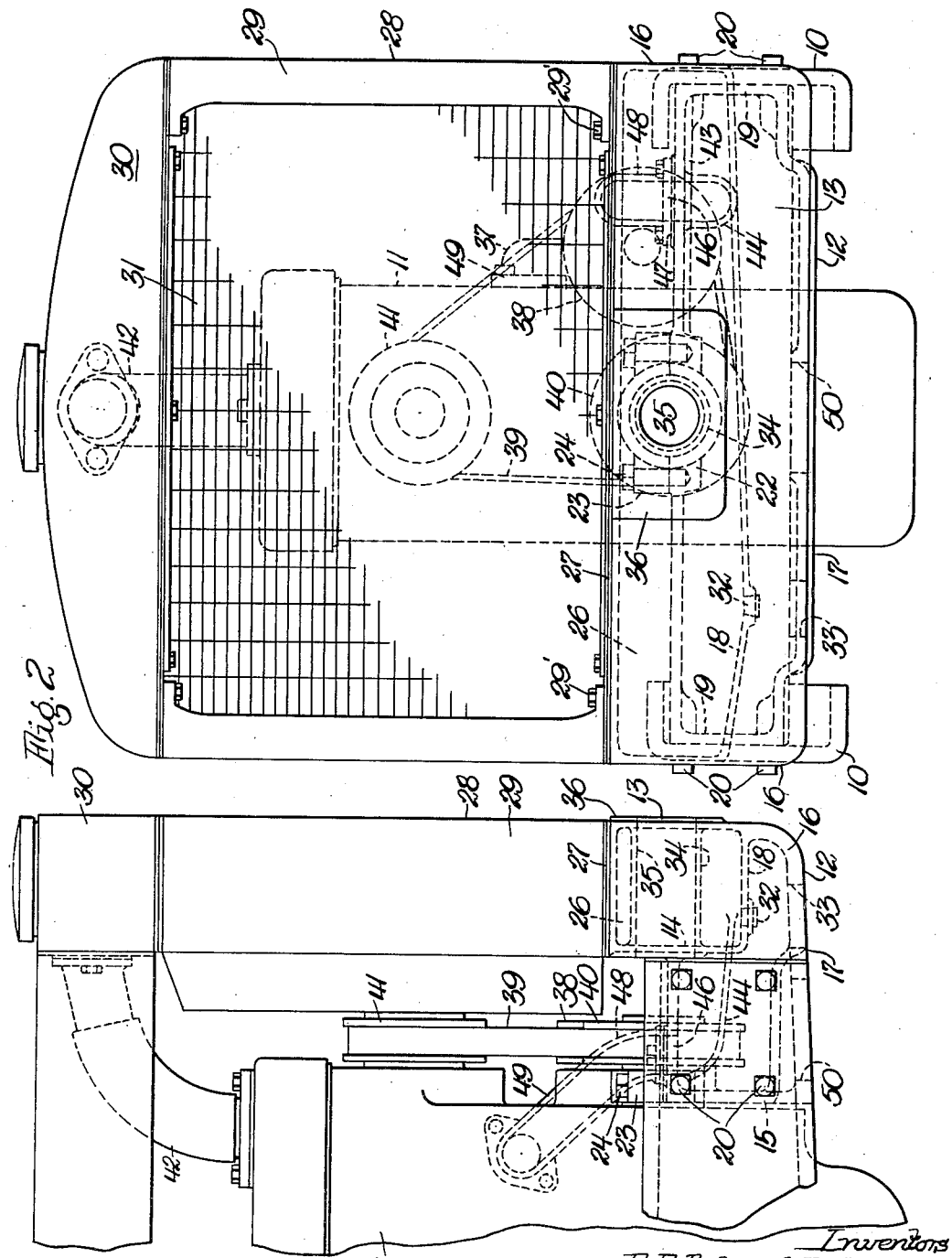

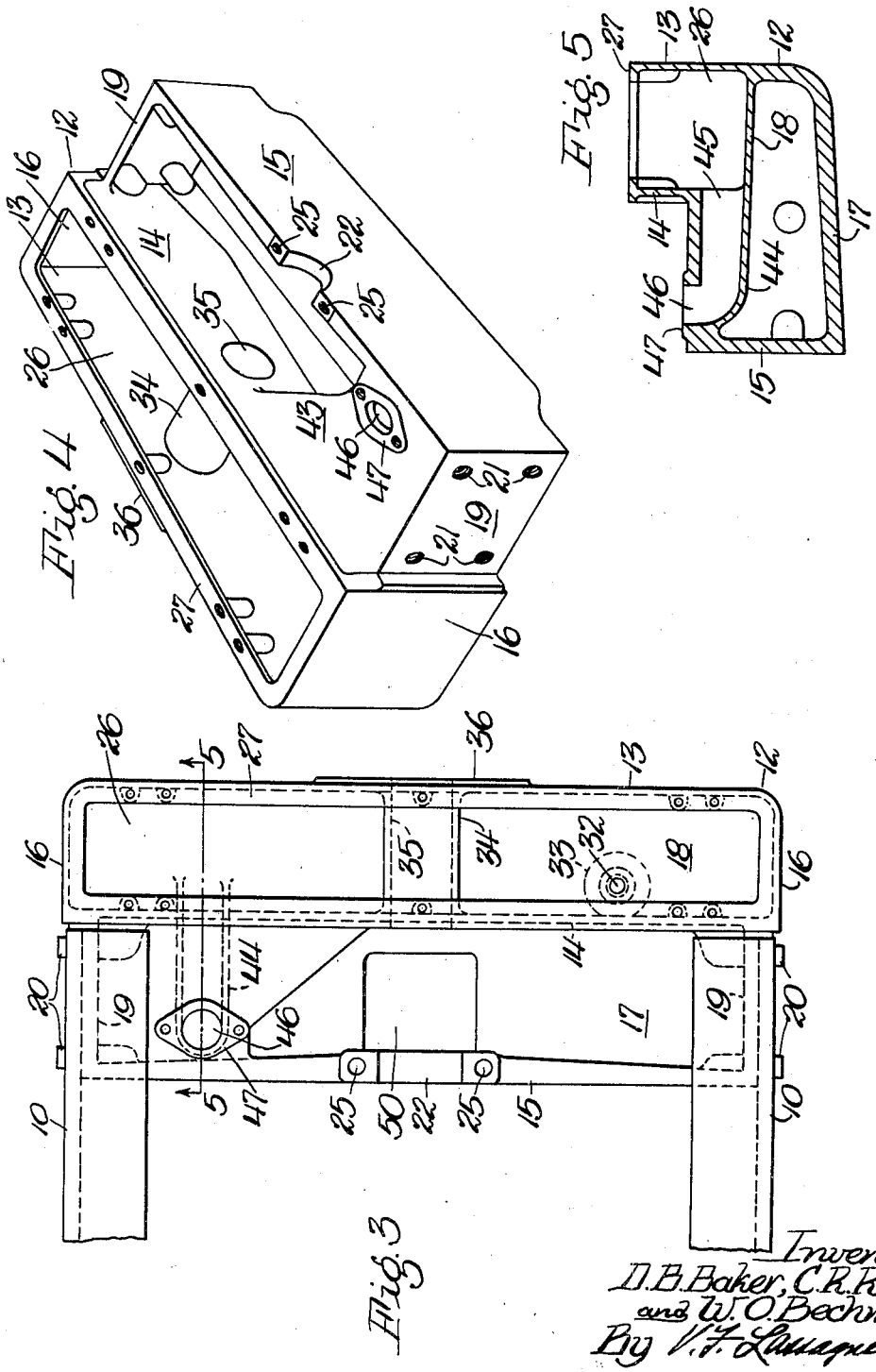

2,152,579

UNITED STATES PATENT OFFICE 2,152,579

RADIATOR AND ENGINE SUPPORT

David B. Baker, Riverside, Clifford R. Rogers, Oak Park, and William O. Bechman, Chicago, Ill., assignors to International Harvester Company, a corporation of New Jersey Application November 4, 1937, Serial No. 172,807

7 Claims. (Cl. 180—54)

This invention relates to a radiator and engine support for a vehicle having an engine supported between a pair of side frame members, said radiator and engine support embodying a front end construction for the vehicle in which a portion of the support carries the engine and another portion carries the radiator and serves as the lower water tank therefor.

This invention contemplates the provision of a front end construction, especially for a tractor, as the structure is particularly well adapted for such use because of its combined strength and simplicity. Front end constructions for tractors have long presented problems brought about by the rigid requirements necessary to provide a suitable structure for the purposes of bracing the tractor frame and for supporting an engine and a radiator.

In numerous instances, it was necessary to provide separate supports for each of the above mentioned purposes, and in certain specific instances, if a single support was provided for all three purposes, the resulting structure was of great weight and was difficult to manufacture. In an improved construction, as provided by the present invention, it is found desirable to provide a support incorporating a design adapted to combine all three of the above purposes, and at the same time to serve also as the lower water tank of the radiator.

The principal object of the invention, then, is to provide a combined radiator and engine support for the purposes mentioned above.

An important object of the invention is to provide a radiator and engine support which is generally light weight in construction and which is formed with a considerably thicker portion, said portion thereby being reenforced to support the engine of the vehicle.

An important object of the invention is to provide a support that may be readily adapted for installation in a vehicle to carry the engine adjacent the forward end of its crank-shaft.

Another important object is to provide the support with a hollow portion above which a radiator is adapted to be supported, said hollow portion serving as the lower water tank of the radiator.

Another object is to provide a hollow sleeve portion within the tank portion substantially coaxial with the engine supporting portion, said sleeve portion being adapted to receive a starting crank for engagement with the crank-shaft of the engine.

Another object is to provide comparatively light weight walls and a bottom enclosing the tank portion, said tank portion being provided with a water drain.

Another object of the invention is to provide the support with generally thicker, stronger, reenforcing bottom and side portions, said bottom being formed with an opening in alignment with the water drain for providing access thereto.

Another object of the invention is to provide the support with a water outlet communicating with the tank portion and to which a connection may be made with the water circulating system of the engine.

Still another object is to provide a substantially hollow portion disposed rearwardly of the tank portion for accommodating certain depending parts of the engine.

And still another object is to provide an opening in said thicker bottom through which access may be had to said depending parts of the engine.

Briefly, these and other objects are attained in a practicable form of the invention as illustrated, in which an integral cast support generally comprises a box-like structure having front and rear walls and divided by an intermediate wall into two hollow portions. This support is adapted to be secured between the opposite side frame members of a vehicle. The forward portion of the support is adapted to carry a radiator and to serve as the lower water tank therefor. The rearward portion of the support is adapted to carry the engine of the vehicle and the hollow portion adjacent the rear wall accommodates certain depending parts of the engine. The engine is carried on the support adjacent the forward end of its crank-shaft, and the tank portion of the support is provided with a hollow sleeve portion through which a starting crank may be inserted to crank the engine. A water outlet is provided in the support and communicates with the tank portion, said outlet being adapted to be connected to the water circulating system of the engine.

A further understanding of the objects and desirable features of the invention may be had from the following detailed description taken in conjunction with the accompanying sheets of drawings, in which:

Figure 1 is a general side elevational view illustrating the support and the manner in which it supports the engine and the radiator and is connected to the water circulating system of the engine;

Figure 2 is a front elevational view of the same;

Figure 3 is a plan view of the support as secured to the opposite side frame members, the engine and the radiator being omitted from the view;

Figure 4 is a detailed perspective view showing the general design of the support; and, Figure 5 is a detailed sectional view taken on the line 5—5 of Figure 3, showing especially the water tank portion and the water outlet communicating therewith.

In a preferred embodiment of the invention, as shown in the drawings, the supporting structure is utilized in conjunction with a tractor frame comprising a pair of spaced-apart, longitudinal, side frame members 10, in the present instance, being channel-shaped in cross-section. Only the forward portions of the frame members are shown, and an engine 11 is disposed therebetween, being supported on the frame members at its rearward end in any well known manner, not shown, as is well understood by those skilled in the art. The support, as previously mentioned, comprises an integrally cast box-like structure 12 having front, intermediate and rear walls 13, 14 and 15, respectively, opposite side walls 16, a main bottom 17 and a secondary bottom 18. The general construction of the support is best shown in perspective in Figure 4.

Portions of the side walls 16 are finished as at 19 for disposition between the forward ends of the side frame members 10, said support being secured between the frame members 10 by a plurality of bolts 20 threaded into tapped bores 21 formed in the finished side portions 19. The rear wall of the support is formed comparatively thicker at its upper mid-portion and is provided with a semi-circular engine-supporting portion 22. This portion 22 is adapted to receive an axially extending portion of the engine to support the engine adjacent the forward end of its crank shaft. A cap member 23 is fitted over the extending portion of the engine and is secured to the support by bolts 24 threaded into tapped bores 25 formed in the rear wall 15 of the support. In conjunction with the conventional rear mounting of the engine, the new and improved support provides an ideal engine suspension of the three point type, although it will be seen that the support is equally well adapted for a four or more point suspension. The gradual thickening of the rear wall 15 toward the engine supporting portion 22 provides a support with sufficient reenforcement to carry the weight of the forward portion of the engine. It will be appreciated that numerous types of mountings, such as rubber or spring mountings, may be utilized in carrying the engine on the support.

As best shown in Figures 2 and 5, the front and intermediate walls 13 and 14, the two side walls 16 and the secondary bottom 18 enclose and form a substantially hollow portion 26, above which, on a substantially flat face 27 of the support, is carried a conventional radiator 28. The radiator includes a frame or shell 29, which is secured by bolts 29' to the flat portion 27 of the support. An upper water tank 30 is secured to and above the shell 29 and is associated in the conventional manner with a radiator core 31. The hollow portion 26 at the forward end of the support also communicates with the radiator core 31 and serves as the lower water tank of the radiator.

It will be noted from the drawings that the walls of the supports surrounding the hollow tank portion 26 are formed comparatively thin in cross-section, as these walls contribute more to lightness than to strength and rigidity of the support. It will be also noted that the main bottom portion 17, rear wall 15 and the lower portion of the front wall 13 are formed comparatively thicker in cross-section, as are the side wall portions 19, for the purpose of strengthening the support for maintaining spaced relation of the frame members 10, in addition to supporting the radiator and the forward portion of the engine. The secondary bottom 18 is inclined toward one side and is provided with a water drain 32. The main bottom 17 is provided with an opening 33 substantially in alinement with the water drain 32 to provide access thereto when it is necessary to remove the drain plug.

Within the hollow tank portion 26, the support 12 is formed with a hollow sleeve portion 34 having a longitudinal opening 35 substantially coaxial with the engine supporting portion 22 and with the engine crankshaft. This sleeve portion is entirely enclosed from the tank portion 26 and is provided for the purpose of permitting a starting crank to be inserted therethrough for engagement with the engine crank shaft for cranking the engine. In the present embodiment of the invention, as shown and described, the sleeve portion 34 is cast integral with and connects the front wall 13 and the intermediate wall 14 and no water from the tank portion 26 may escape through the opening 35. The front face of the front wall 13 is formed with a finished surface 36 surrounding the opening 35, which surface may be provided with openings to which a permanently attached starting crank assembly may be secured.

The engine 11 is spaced rearwardly from the radiator 29 and is provided with a water circulating and cooling system which includes a water pump 37, which is driven by a pulley 38 which is in turn driven by a belt 39 thereabout and about a pulley 40 driven by the crank-shaft of the engine. The belt 39 is also trained about and drives a pulley 41 carried by a fan assembly of the usual type, not shown. The upper water tank 30 of the radiator is connected to the water circulating system of the engine by a conventional type of hose connection 42.

The support 12 is provided with an integral flat top portion 43 between the intermediate wall 14 and the rear wall 15. In conjunction with this flat portion 43 and with the hollow tank portion 26, a water outlet or conduit 44 is formed, said outlet communicating with the tank portion 26 and the flat portion 43 by openings 45 and 46, respectively. A finished surface 47 is formed on the flat portion 43 surrounding the opening 46 to which a water-tight connection may be made to the water circulating system of the engine. This connection is in the form of a hose or conduit 48 communicating with the water pump 37 and a conduit 49 connecting the water pump with the engine block. From the foregoing description, it will be seen that the support 12 provides both a support and a lower water tank for the radiator and that said support is so designed as to be easily connected to the water circulating system of the engine.

It will be noted also, as best shown in Figures 1 and 4, that the hollow portion between the intermediate walls 14 and 15 is so designed as to accommodate certain depending parts of the engine. In the present instance, these depending parts are the drive pulleys 38 and 40. As best shown in Figure 5, it will be seen that the comparatively thicker bottom portion 17 extends rearwardly from the front wall 13 to the rear wall 15, thus adding to the strength and rigidity of the support. This bottom portion 17, however, is provided with an opening 50 substantially below the drive pulley 40 and provides access thereto from below. Another purpose of this opening 50 is to prevent the collection of grease, dirt or other foreign particles in the space between the intermediate and rear walls.

Many other important features of design are incorporated in the structure of the support 12, all of which lend to the ready adaptation of the support to a vehicle of the type disclosed. It will be understood, of course, that numerous modifications and alterations may be made in the shape and design of the support without departing from the spirit and scope of the invention as defined in the appended claims.

What is claimed is:

1. A combined radiator and engine support for a vehicle having an engine disposed between a pair of side frame members, said support being adapted to be secured between the frame members and comprising a box-like structure having front, rear, intermediate and side walls, a main bottom, and a secondary bottom spaced above the main bottom, said rear wall being adapted to support the engine, said front, intermediate and side walls and the secondary bottom forming a hollow portion open at the top for supporting and serving as the lower water tank for a radiator, said secondary bottom having a water drain and said main bottom having an opening in alinement with said drain to provide access thereto.

2. A combined radiator and engine support for a vehicle having an engine disposed between a pair of side frame members, said support being adapted to be secured between the frame members and comprising a box-like structure having front, rear, intermediate and side walls, a main bottom, and a secondary bottom spaced above the main bottom, said rear wall being adapted to support the engine, said front, intermediate and side walls and the secondary bottom forming a hollow portion open at the top for supporting and serving as the lower water tank for a radiator, said secondary bottom having a water drain and said main bottom having an opening in alinement with said drain to provide access thereto, said open portion of the support between the intermediate and rear walls being adapted to accommodate certain depending portions of the engine.

3. A combined radiator and engine support for a vehicle having an engine disposed between a pair of side frame members, said support being adapted to be secured between the frame members and comprising a box-like structure having front, rear, intermediate and side walls, a main bottom, and a secondary bottom spaced above the main bottom, said rear wall being adapted to support the engine, said front, intermediate and side walls and the secondary bottom forming a hollow portion open at the top for supporting and serving as the lower water tank for a radiator, said secondary bottom having a water drain and said main bottom having an opening in alinement with said drain to provide access thereto, said open portion of the support between the rear and intermediate walls being adapted to accommodate certain depending portions of the engine, the main bottom below said portion having an opening formed therein.

4. A combined radiator and engine support for a vehicle having an engine disposed between a pair of side frame members, said support being adapted to be secured between the frame members and comprising a box-like structure having front, rear, intermediate and side walls, a main bottom, and a secondary bottom spaced above the main bottom, said rear wall being adapted to support the engine, said front, intermediate and side walls and the secondary bottom forming a hollow portion open at the top for supporting and serving as the lower water tank for a radiator, said secondary bottom having a water drain and said main bottom having an opening in alinement with said drain to provide access thereto, said intermediate wall being formed with an opening communicating with the hollow tank portion, to which opening a connection may be made to the water circulating system of the engine.

5. A combined radiator and engine support for a vehicle having an engine disposed between a pair of side frame members, said support being adapted to be secured between the frame members and comprising a box-like structure having front, rear, intermediate and side walls, a main bottom, and a secondary bottom spaced above the main bottom, said rear wall being adapted to support the engine, said front, intermediate and side walls and the secondary bottom forming a hollow portion open at the top for supporting and serving as the lower water tank for a radiator, said secondary bottom having a water drain and said main bottom having an opening in alinement with said drain to provide access thereto, said support being formed with a hollow sleeve portion connecting the front and intermediate walls above the secondary bottom and enclosed from the tank portion through which a starting crank may be inserted to crank the engine.

6. A combined radiator and engine support for a vehicle having an engine disposed between a pair of side frame members, said support being adapted to be secured between the frame members and comprising an integral casting forming a box-like structure having front, rear, intermediate and side walls, a main bottom, and a secondary bottom spaced above the main bottom, said secondary bottom being of comparatively less thickness than the main bottom, said rear wall being comparatively thicker and adapted to support the engine, said front, intermediate and side walls and the secondary bottom forming a hollow portion open at the top for supporting and serving as the lower water tank for a radiator, said secondary bottom having a water drain and said main bottom having an opening in alinement with said drain to provide access thereto.

7. A combined radiator and engine support for a vehicle having an engine disposed between a pair of side frame members, said support being adapted to be secured between the frame members and comprising a casting forming a box-like structure having integral front, rear, intermediate and side walls, a main bottom, and a secondary bottom spaced above the main bottom, said secondary bottom being of comparatively less thickness than the main bottom and having a drain therein, said rear wall being comparatively thicker and adapted to support the engine, said front, intermediate and side walls and the secondary bottom forming a hollow portion open at the top for supporting and serving as the lower water tank for a radiator, said main bottom having an opening in alinement with the aforesaid drain to provide access thereto, said support being formed with an integral flat portion connecting the rear and intermediate walls, said flat portion having an opening therein, said support being further formed with an integral water outlet connecting the tank portion and the opening, said flat portion being adapted to have secured thereto over the opening therein a connection to the water circulating system of the engine.

DAVID B. BAKER.
CLIFFORD R. ROGERS.
WILLIAM O. BECHMAN.